(12) United States Patent
Cox

(10) Patent No.: US 11,480,977 B2
(45) Date of Patent: Oct. 25, 2022

(54) SHARING SENSOR DATA TO ASSIST IN MANEUVERING OF AN AUTONOMOUS VEHICLE

(71) Applicant: GM Cruise Holdings LLC, San Francisco, CA (US)

(72) Inventor: Matthew Cox, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 364 days.

(21) Appl. No.: 16/695,149

(22) Filed: Nov. 25, 2019

(65) Prior Publication Data

US 2021/0157332 A1    May 27, 2021

(51) Int. Cl.
| | | |
|---|---|---|
| G05D 1/00 | (2006.01) | |
| G08G 1/00 | (2006.01) | |
| H04W 4/46 | (2018.01) | |
| G05D 1/02 | (2020.01) | |
| G08G 1/0967 | (2006.01) | |
| G08G 1/01 | (2006.01) | |

(52) U.S. Cl.
CPC ......... *G05D 1/0276* (2013.01); *G05D 1/0088* (2013.01); *G05D 1/0291* (2013.01); *G08G 1/0112* (2013.01); *G08G 1/096741* (2013.01); *G08G 1/096791* (2013.01); *H04W 4/46* (2018.02); *G05D 2201/0213* (2013.01)

(58) Field of Classification Search
CPC .. G05D 1/0276; G05D 1/0088; G05D 1/0291; G05D 2201/0213; G05D 1/00; G08G 1/0112; G08G 1/096741; G08G 1/096791; G08G 1/164; G08G 1/167; G08G 1/00; G08G 1/16; H04W 4/46; H04W 4/023; H04W 4/024; H04W 4/38; H04W 4/44; H04W 4/00; B60W 30/00; B60W 30/09; B60Q 9/00; B60Q 9/004; B60Q 9/006; B60Q 9/008
See application file for complete search history.

(56) References Cited

U.S. PATENT DOCUMENTS

| | | | | |
|---|---|---|---|---|
| 8,761,991 | B1 * | 6/2014 | Ferguson | G08G 1/096725 701/28 |
| 9,158,980 | B1 * | 10/2015 | Ferguson | G08G 1/096716 |
| 9,465,388 | B1 * | 10/2016 | Fairfield | G05D 1/0044 |
| 10,730,512 | B2 * | 8/2020 | Kutila | B60Q 9/008 |

* cited by examiner

*Primary Examiner* — Yonel Beaulieu
(74) *Attorney, Agent, or Firm* — Calfee, Halter & Griswold LLP

(57) ABSTRACT

An autonomous vehicle including a sensor system configured to detect an environment in a field of view of the autonomous vehicle and to output data of the detected environment. A computing system of the autonomous vehicle can detect that a portion of a roadway along a route of the autonomous vehicle in the field of view of the autonomous vehicle is obscured. Responsive to the detection of the obscured portion of the roadway, the computing system can transmit a request for a second autonomous vehicle to view the portion of the roadway. The computing system can receive fill data representative of an output of a second sensor system of the second autonomous vehicle detecting the portion of the roadway in a field of view of the second autonomous vehicle.

20 Claims, 8 Drawing Sheets

SHARING SENSOR DATA TO ASSIST IN MANEUVERING OF AN AUTONOMOUS VEHICLE

BACKGROUND

An autonomous vehicle is a vehicle that is configured to navigate about roadways based upon sensor signals outputted by sensors of the autonomous vehicle; the autonomous vehicle typically navigates the roadways without input from a human. The autonomous vehicle is configured to identify and track objects (such as vehicles, pedestrians, bicyclists, static objects, and so forth) based upon the sensor signals output by the sensors of the autonomous vehicle and perform driving maneuvers (such as accelerating, decelerating, turning, stopping, etc.) based upon the identified and tracked objects.

There are scenarios, however, where the autonomous vehicle has no or limited visibility with respect to a spatial region (e.g., due to occlusion by object(s) in the environment, road geometries, inherent sensor limitations, etc.). A spatial region where the autonomous vehicle has no or limited visibility is referred to herein as an obstructed region. There is uncertainty associated with this obstructed region, as the autonomous vehicle may be unable to ascertain whether there is an object in the obstructed region, whether the object is moving in the obstructed region, and so forth.

In an example, the autonomous vehicle may be traveling along a lane of a roadway and may encounter a truck that is stopped in the lane of the roadway (e.g., the truck may be double-parked, the truck may be disabled, etc.). As the autonomous vehicle moves closer to the back of the truck, a portion of a field of view of a sensor of the autonomous vehicle is obstructed by the truck, resulting in an obstructed region (from the perspective of the autonomous vehicle) that includes a portion of the lane of the roadway behind the truck and at least a portion of an adjacent lane of the roadway (where the adjacent lane includes oncoming traffic). Accordingly, the autonomous vehicle may lack visibility into the obstructed region and be unable to ascertain whether to attempt to drive around the truck, which can detrimentally impact operation of the autonomous vehicle (e.g., the autonomous vehicle may stop for an extended period of time until the truck moves, a human operator may take over control of the autonomous vehicle, or the like).

SUMMARY

The following is a brief summary of subject matter that is described in greater detail herein. This summary is not intended to be limiting as to scope of the claims.

Described herein are various technologies pertaining to an autonomous vehicle that is configured to identify an obstructed region based upon a sensor signal output by a sensor of the autonomous vehicle and is further configured to request a second autonomous vehicle view the obstructed region. With more specificity, the autonomous vehicle can define the obstructed region by identifying a spatial region in an environment where the autonomous vehicle lacks visibility. Further, the autonomous vehicle can transmit a request for a second autonomous vehicle to view at least a part of the obstructed region. Moreover, the autonomous vehicle can receive data representative of a sensor signal output by a sensor of the second autonomous vehicle detecting at least a part of the obscured region.

In an example, the autonomous vehicle is traveling in a first lane of a two-lane roadway, where traffic in a second lane of the two-lane roadway flows in a direction that is opposite the flow of traffic in the first lane. The autonomous vehicle, when travelling along a route, comes upon a truck that is stopped in the first lane of the roadway. The autonomous vehicle identifies the truck and further identifies an obstructed region based upon the truck being identified and a location of the truck relative to the location of the autonomous vehicle. The obscured region (e.g., the spatial region where the autonomous vehicle is "blind" due to the existence of the truck) encompasses a portion of the second lane. To reach its intended destination, the autonomous vehicle may need to continue travelling along the roadway and thus may exit the first lane and enter the second lane (of oncoming traffic) in order to pass the truck.

In connection with detecting this obscured region, the autonomous vehicle can transmit a request for a second autonomous vehicle to view at least a portion of the obscured region to determine whether an object (or objects) is in the second lane in the obscured region before the autonomous vehicle enters the second lane in order to pass the truck. For instance, the second autonomous vehicle can be traveling along a route in the second lane and can identify whether a vehicle is traveling along a portion of the second lane in the obstructed region (or some other object is in the second lane in the obstructed region). The autonomous vehicle can then use this information to determine whether to maneuver around the truck by entering the second lane.

The above-described technologies present various advantages over conventional approaches to autonomous vehicle operation. First, unlike the conventional approach of requiring a human to take control of the autonomous vehicle to determine whether the obstructed region is free of objects (e.g., vehicles, pedestrians, bicyclists, static objects, etc.), the above-described technologies provide a system for a second autonomous vehicle to provide data to fill in the obstructed region. Moreover, instead of relying on the autonomous vehicle to carry a device for detecting this obstructed region (e.g., a drone), the above-described technologies leverage one or more autonomous vehicles already traveling in the region to providing fill data for the autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
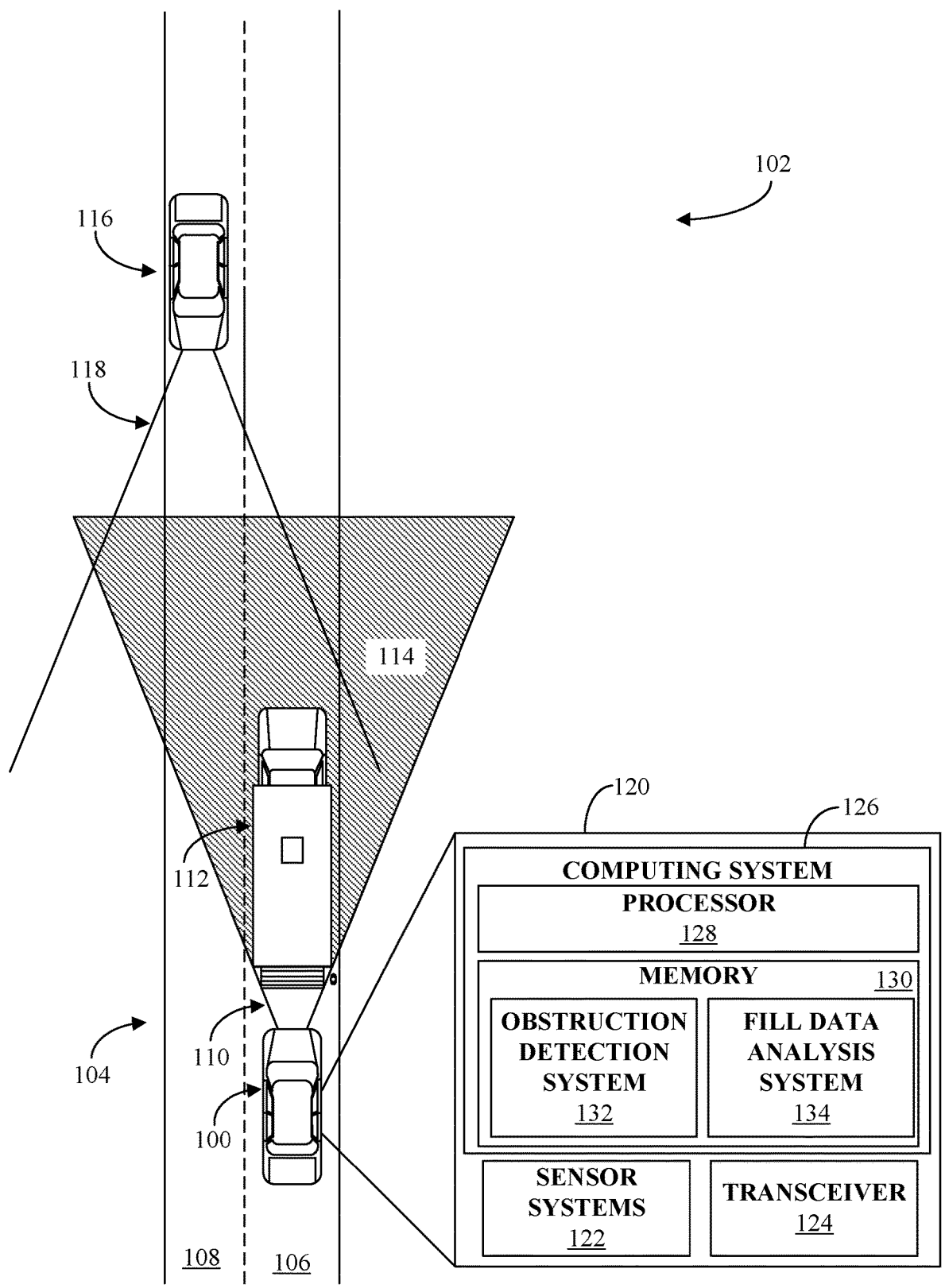
FIG. 1 is a schematic that illustrates an autonomous vehicle requesting a second autonomous vehicle view a spatial region that is obstructed from a perspective of a sensor of the autonomous vehicle.

Various technologies pertaining to an autonomous vehicle identifying an obstructed region in a field of view of the autonomous vehicle and requesting a second autonomous vehicle view the obstructed region are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Disclosed are various technologies that generally relate to an autonomous vehicle that is configured to identify an obstructed region based upon a sensor signal output by a sensor of the autonomous vehicle and is further configured to request a second autonomous vehicle view the obstructed region. With more specificity, the autonomous vehicle can define the obstructed region by identifying a spatial region where the autonomous vehicle lacks visibility, transmit a request for a second autonomous vehicle to view at least a part of the obstructed region, and receive data representative of a sensor signal output by a sensor of the second autonomous vehicle detecting at least the part of the obscured region.

According to various embodiments, a first autonomous vehicle can fill in a map of its surroundings with sensor data (e.g., fill data) generated by a second autonomous vehicle that is in geographic proximity to the first autonomous vehicle. In operation, the first autonomous vehicle can process its sensor data and ascertain portions in the 3D environment of the first autonomous vehicle where the first autonomous vehicle is unable to acquire data, but such data may be helpful to operation of the autonomous vehicle. Upon recognizing this type of blind spot, the first autonomous vehicle can report the location of the blind spot to a central server (e.g., a dispatch server system), which identifies a second autonomous vehicle in the geographic region. When the second autonomous vehicle has a view of the blind spot, the second autonomous vehicle causes (in an example) raw sensor data from the second autonomous vehicle to be transmitted to the first autonomous vehicle. The first autonomous vehicle can then fill in the blind spot with the sensor data generated by the second autonomous vehicle, and the first autonomous vehicle can maneuver based upon such data. When the second autonomous vehicle is not in proximity to the first autonomous vehicle, the central server can direct the second autonomous vehicle to a location where the second autonomous vehicle can capture data that is helpful to the first autonomous vehicle. In an alternative embodiment, rather than transmitting raw sensor data, the second autonomous vehicle can perform object detection in a region where the first autonomous vehicle has a blind spot, and can transmit a message to the first autonomous vehicle as to a type of object (if any) in the blind spot, location of the object in the blind spot, direction of motion of the object, and other information that may be helpful to the first autonomous vehicle when maneuvering in the environment of the first autonomous vehicle. Accordingly, fill data described herein can include raw sensor data, processed sensor data (e.g., specifying a type of a detected object, location of the detected object, direction of motion of the detected object, etc.), or a combination thereof.

Pursuant to an illustration, raw sensor data can be live streamed from the second autonomous vehicle to the first autonomous vehicle. According to another illustration, processed sensor data can be live streamed from the second autonomous vehicle to the first autonomous vehicle.

With reference now to FIG. 1, a schematic that illustrates an operating environment 102 of an autonomous vehicle 100 is depicted. The operating environment 102 includes a roadway 104 along which the autonomous vehicle 100 travels. In the illustrated embodiment 102, the roadway 104 comprises a first lane 106 and a second lane 108, where traffic in the first lane 106 and traffic in the second lane 108 flow in opposite directions. Further, in the exemplary environment 102, the first lane 106 is immediately adjacent the second lane 108.

In the illustrated environment 102, a truck 112 is stopped in the first lane 106 and the autonomous vehicle 100 traveling in the first lane 106 has come behind the truck 112 in the first lane 106. To reach its intended destination, the autonomous vehicle 100 is to continue along the roadway 104 along its current direction of travel. To do so, the autonomous vehicle 100 either waits for the truck 112 to resume moving in the first lane 106 or navigates around the truck 112. To navigate around the truck 112, the autonomous vehicle 100 exits the first lane 106, enters the second lane 108, and travels in the second lane 108 against the flow of traffic in the second lane 106 to pass the truck 112 until clear to return to the first lane 106. The technologies described herein can be employed to navigate around the truck 112.

More specifically, the autonomous vehicle 100 includes componentry configured to detect when a portion of the roadway along a route of the autonomous vehicle 100 is obscured and to fill in a map with sensor data generated by a second autonomous vehicle (or a plurality of other autonomous vehicles). Componentry of the autonomous vehicle 100 is illustrated in callout 120. The autonomous vehicle 100 includes sensor systems 122, a transceiver 124, and a computing system 126. The sensor systems 122 may be configured to output data representative of an environment exterior of the autonomous vehicle 100. The sensor systems 122 may include one or more sensors that are arranged about the autonomous vehicle 100, as will be described in detail below. The transceiver 124 is configured to transmit data from the autonomous vehicle 100 and/or receive data at the autonomous vehicle 100.

The computing system 126 may be in communication with the sensor systems 122 and the transceiver 124. The computing system 126 includes a processor 128 and memory 130 that includes computer-executable instructions that are executed by the processor 128. In an example, the processor 128 can be or include a graphics processing unit (GPU), a plurality of GPUs, a central processing unit (CPU), a plurality of CPUs, an application-specific integrated circuit (ASIC), a microcontroller, or the like. The memory 130 includes an obstruction detection system 132 and a fill data analysis system 134.

Due to the position of the truck 112 in the first lane 106 relative to the position of the autonomous vehicle 100, the autonomous vehicle 100 lacks visibility with respect to certain portions of the environment 102. For instance, as the autonomous vehicle 100 approaches the back of the truck 112, a portion of the field of view 110 of the sensor systems 122 is obstructed by the truck 112 (e.g., the sensor systems 122 are unable to "see" around the truck 112). Thus, there is an obstructed region 114 from the perspective of the autonomous vehicle 100. The obstructed region 114 is a spatial region where the autonomous vehicle 100 has little or no visibility—e.g., the autonomous vehicle 100 is unable to determine whether there is an object (e.g., a vehicle, pedestrian, bicyclist, static object) in the obstructed region 114, whether there is an object moving in the obstructed region 114, the condition of the roadway in obstructed region 114, etc. The obstructed region 114 includes a portion of the second lane 108 of the roadway 104, thus it is possible that a vehicle is traveling in the second lane 108 but the vehicle may not be detected by the autonomous vehicle 100 due to the vehicle being in the obstructed region 114. As will be described below, the computing system 126 is configured to detect when an object (the truck 112) has obscured the field of view of the sensor systems 122 and to fill in a map of the operating environment 102 with sensor data generated by the second autonomous vehicle 116. The map can be filled by requesting other autonomous vehicle(s) provide sensor data corresponding to at least a portion of the obscured region (or information derived from such sensor data). The request may be sent directly to another autonomous vehicle or to a server (e.g., a dispatch server system), which may further send the request to the other autonomous vehicle.

The obstruction detection system 132 is configured to detect when a portion of a field of view 110 of the sensor systems 122 is obstructed by an object (e.g., the truck 112). Responsive to detecting that a portion of the field of view 110 of the sensor systems 122 is obstructed, the computing system 126 transmits, via the transceiver 124, a request for a second autonomous vehicle to view at least a part of the obscured portion.

In one embodiment, the request is directly transmitted from the autonomous vehicle 100 to a second autonomous vehicle 116. In another embodiment, the request is transmitted from the autonomous vehicle 100 to a dispatch server system, which then transmits a corresponding request to a second autonomous vehicle 116, as will be described in detail below. In an embodiment, the dispatch server system may be further configured to establish a peer-to-peer connection network between the autonomous vehicle 100 and the second autonomous vehicle 116. In another embodiment, the dispatch server system provides to the autonomous vehicle 100 suitable identification information about the second autonomous vehicle 116 that is used by the autonomous vehicle 100 to establish a peer-to-peer connection network between the autonomous vehicle 100 and the second autonomous vehicle 116. The fill data, described below, may be transmitted over this peer-to-peer connection network. In other embodiments, communication between the autonomous vehicle 100 and the second autonomous vehicle can pass through the dispatch server system.

The computing system 126 may be configured to transmit supplementary information in addition to the request described above. For example, the computing system 126 can transmit geolocation data of the autonomous vehicle 100 and/or geolocation data of an object (e.g., the truck 112 in the example of FIG. 1) when the obstruction detection system 132 detects the portion of a field of view 110 of the sensor systems 122 is obstructed by the object. In another example, the computing system 126 can transmit data specifying a direction the autonomous vehicle 100 is traveling relative to the object. In a further example, the computing system 126 can transmit orientation data representative of an orientation of the autonomous vehicle 100 relative to the object. In yet another example, the computing system 126 may transmit a timestamp of when the obstruction detection system 132 detects the portion of a field of view 110 of the sensor systems 122 is obstructed by the object. Any suitable information may be transmitted.

The obstruction detection system 132 may be further configured to selectively transmit the request based on the portion of the field of view 110 obstructed. Selectively transmitting the request and/or the information can be used to regulate the allocation of processing power of the autonomous vehicle 100. For instance, the request and/or information is transmitted where the portion of the field of view 110 obstructed by the object includes the roadway 104 the autonomous vehicle 100 is traveling along. Whereas, when the portion of the field of view 110 obstructed by the object does not include the roadway 104, no request may be transmitted.

The fill data analysis system 134 is configured to receive, via the transceiver 124, and analyze data representative of a field of view 118 of sensor systems in the second autonomous vehicle 116 detecting at least a part of the obscured portion (e.g., the obscured region 114). The fill data analysis system 134 may then use this data from the second autonomous vehicle 116 to fill in portions of a map of the operating environment 102 that are obscured by the object (as well as any other object). For instance, in the illustrated embodiment, the fill data analysis system 134 may use data from the second autonomous vehicle 116 to determine that there is no vehicle in the obstructed region 114 of the second lane 108. The autonomous vehicle 100 can then use this determination to navigate around the truck 112.

Similar to the request described above, in one embodiment, the fill data is directly transmitted from the second autonomous vehicle 116 to the autonomous vehicle 100. In another embodiment, the fill data is transmitted from the second autonomous vehicle 116 to a dispatch server system which then transmits it to the autonomous vehicle 100.

Figure 2:
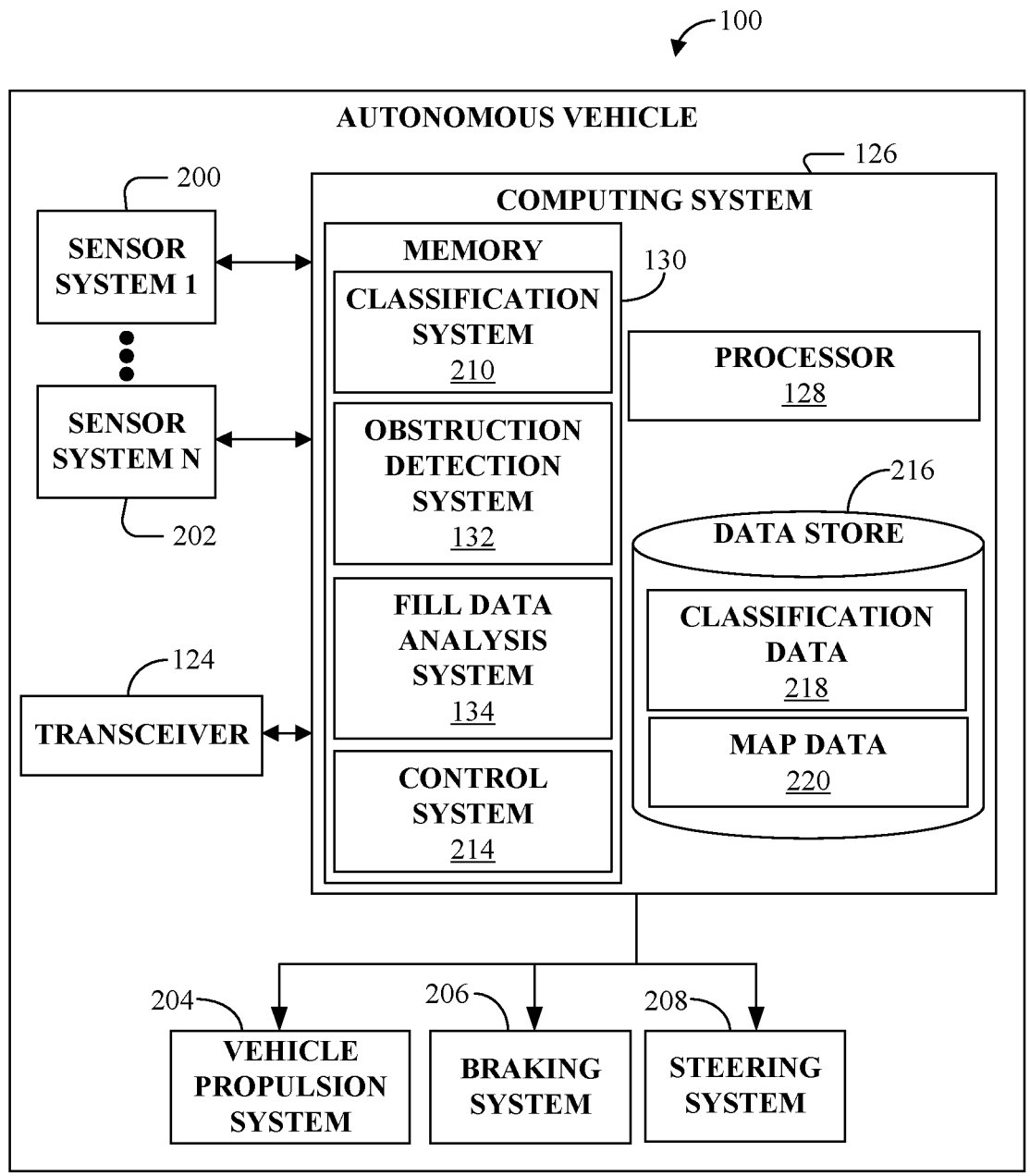
FIG. 2 illustrates an exemplary autonomous vehicle.

Turning now to FIG. 2, illustrated is a block diagram of the exemplary autonomous vehicle 100 of FIG. 1. The autonomous vehicle 100 can navigate about roadways without human conduction based upon sensor signals output by the sensor systems 122 of the autonomous vehicle 100. The sensor systems 122 of the autonomous vehicle 100 illustrated in FIG. 1 include a plurality of sensor systems in FIG. 2, namely, a sensor system 1 200, . . . , and a sensor system N 202 (collectively referred to herein as sensor systems 200-202). The sensor systems 200-202 may be of different types and may be arranged about the autonomous vehicle 100. For example, the sensor system 1 200 may be a lidar sensor system and the sensor system N 202 may be a camera (image) system. Other exemplary sensor systems 200-202 included are radar sensor systems, global positioning system (GPS) sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 204, a braking system 206, and a steering system 208. The vehicle propulsion system 204 may be an electric motor, an internal combustion engine, a combination thereof, and/or the like. The braking system 206 can include an engine brake, brake pads, actuators, and/or any other suitable componentry that is configured to assist in decelerating the autonomous vehicle 100. The steering system 208 includes suitable componentry that is configured to control the direction of the movement of the autonomous vehicle 100.

The autonomous vehicle 100 additionally comprises the computing system 126 that is in communication with the sensor systems 200-202, the vehicle propulsion system 204, the braking system 206, the steering system 208, and/or the transceiver 124. Again, the computing system 122 includes the processor 128 and the memory 130.

In addition to including the obstruction detection system 132 and the fill data analysis system 134 as described above, the memory 130 includes a control system 214 configured to control operation of the vehicle propulsion system 204, the braking system 206, and/or the steering system 208. Additionally, or alternatively, the memory 126 can further include a classification system 210 that is configured to classify an object observed by the autonomous vehicle 100, as will be described in detail below.

The computing system 122 may further include a data store 216. The data store 216 includes classification data 218 and/or map data 220. The classification data 218 can include data indicative of one or more predefined object classes. Each object class can be further broken down into subordinate classes. For instance, an object class of vehicle can be broken down into car, bus, delivery vehicle, mail truck, motorcycle, and/or the like. The autonomous vehicle 100 can use this data to classify objects in the environment exterior of the autonomous vehicle 100. For instance, the classification system 210 can be configured to use the classification data 218 to classify objects in the environment exterior of the autonomous vehicle 100 that are obscuring a portion of the field of view of the sensor systems 200-202. The classification system 210 may be configured to receive output from the sensor systems 200-202 representative of an environment exterior of the autonomous vehicle 100 detected by the sensor systems 200-202. The classification system 210 can then access the classification data 218 to classify one or more objects in the environment exterior of the autonomous vehicle 100 that are obscuring a portion of the field of view of the sensor systems 200-202. Similar to the supplementary information described above with reference to FIG. 1, the object classification may be transmitted, via the transceiver 124, in addition to the request.

The map data 220 can include data indicative of operating environments traversed by one or more autonomous vehicles. The map data 220 can include any suitable information that can be employed to navigate an autonomous vehicle 100 in the operating environment 102. For instance, the map data 220 can include locations of lane boundaries, locations of traffic signs and signals, locations of manholes, speed limits for roadways, etc.

The map data 220 may yet further include one or more locations of detected objects (e.g., the truck 112) that obscured a portion of the field of view of the sensor systems 200-202 of one or more autonomous vehicles. Autonomous vehicle(s) may be routed to avoid these locations. The locations may also be confirmed and/or updated based on an autonomous vehicle(s) passing the location and detecting the presence, absence, and/or new location of the object. For example, a first autonomous vehicle may detect a location of a parked truck that blocks a portion of a field of view of the first autonomous vehicle. The map data 220 may be updated to include the location of the obscuring object (the parked truck). A second autonomous vehicle may pass by the noted location of the parked truck and detect that the truck is no longer at the noted location. The map data 220 may then be updated to remove the obscuring object indicator at that location.

Further, the object classification data may be used to update and/or alter detected locations of obscuring objects. For example, locations of certain object classes may be timed out, such that indicators of the location of the map data 220 may be removed after a threshold period of time unless a second autonomous vehicle confirms the location of the object. For instance, classes of objects that are likely to move from a detected location subsequent to detection may be timed out. One example would be a bus that is likely to move from a detected obscuring location subsequent to detection.

By updating and/or altering indicators of locations of obscuring objects, the map data 220 will not be covered with old or outdated location indicators. Further, routing of autonomous vehicle(s) will be improved because the autonomous vehicle(s) will not be needlessly routed around no longer appropriate location indicators.

Figure 3:
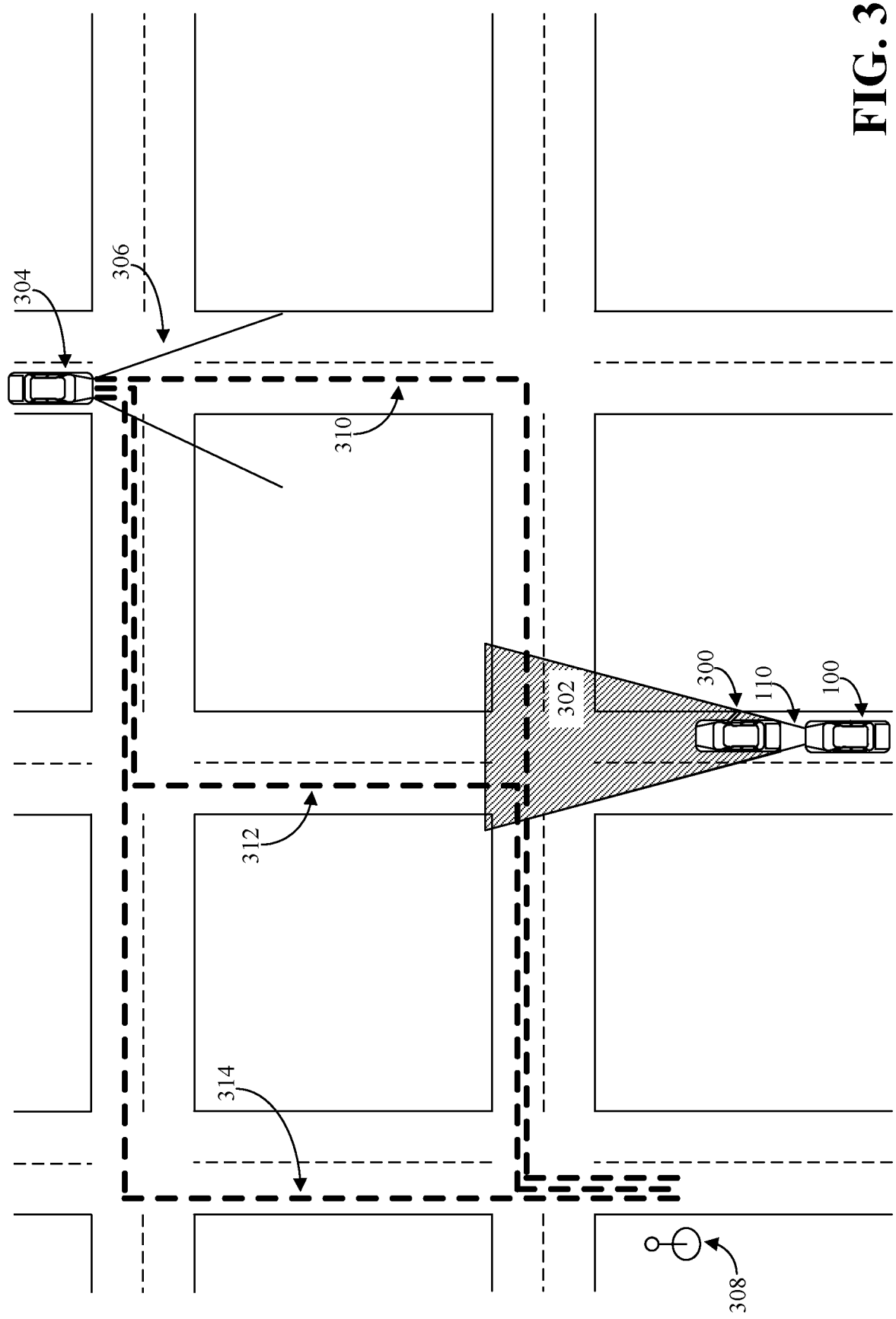
FIG. 3 illustrates an exemplary driving environment of an autonomous vehicle.

Turning now to FIG. 3, a route taken by the second autonomous vehicle may be selected and/or altered based on the request from the autonomous vehicle 100. For instance, a second autonomous vehicle may be routed within a threshold distance of the obscured portion to view at least a part of the obstructed region. In another example, a current route of a second autonomous vehicle may be altered such that the altered route takes the second autonomous vehicle within a threshold distance of the obscured portion to view at least a part of the obscured portion. Any suitable threshold for the distance may be selected and may vary depending on the sensor systems in the second autonomous vehicle, the classification of the obscuring object, the exterior environment near the obscured portion (e.g., building(s), open land), and/or an amount of the portion of the field of view obscured.

In an embodiment illustrated in FIG. 3, an object, car 300, obscures a portion of a field of view 110 of an autonomous vehicle 100. Subsequent to detecting that the portion is obscured, the autonomous vehicle 100 transmits a request for a second autonomous vehicle 304 to view at least a part of the obscured portion 302 within a field of view 306 of the second autonomous vehicle 304. The second autonomous vehicle 304 is currently being routed from the illustrated initial position to a destination 308. The second autonomous vehicle 304 may be routed to the destination 308 such that the second autonomous vehicle 304 passes within a threshold distance of the obscured portion 302. In the illustrated embodiment, the second autonomous vehicle 304 may take a first route 310, a second route 312, or a third route 314 to reach the destination 308. However, only the first route 310 and the second route 312 pass within a threshold distance of the obscured portion 302. Thus, if the second autonomous vehicle 304 takes the third route 314 to the destination 308 it does not pass within a threshold distance of the obscured portion 302.

Any suitable factor or factors may be used to select between the first route 310 and the second route 312. For instance, anticipated travel time of the different routes 310 and 312 may be used to select therebetween. In another example, an amount of the obscured portion 302 viewed by the second autonomous vehicle 304 along the different routes 310 and 312 may be used to select therebetween.

Altering a route of an already traveling second autonomous vehicle based on a request of a first autonomous vehicle may be selectively applied. For instance, a route of a second autonomous vehicle may be altered when an anticipated travel time along the altered route is within a threshold difference from the anticipated travel time of the current route. By controlling when a current route of a second autonomous vehicle is altered, travel time of the second autonomous vehicle is favored while also having the second autonomous vehicle view the obstructed region.

In an embodiment illustrated in FIG. 3, a second autonomous vehicle 304 is traveling along route 314 to its destination 308, when an autonomous vehicle 100 requests a view of an obscured portion 302 of a field of view 110 of the autonomous vehicle 100. Responsive to the request, the current route of the second autonomous vehicle 304 may be altered (e.g., by the dispatch server system, the second autonomous vehicle 304, etc.) such that the second autonomous vehicle 304 travels within a threshold distance from the obscured portion 302 to view at least a portion of the obscured portion 302. In the illustrated embodiment, two potential altered routes 310 and 312 for the second autonomous vehicle 304 are illustrated. In order to choose between the two potential routes, anticipated travel times for each altered route 310 and 312 can be determined and then each anticipated travel time can be compared to an anticipated travel time for the current route 314 to determine whether either falls within the threshold difference. For example, an anticipated travel time along a first altered route 310 may fall outside the threshold while an anticipated travel time along a second altered route 312 falls within the threshold. Accordingly, the second autonomous vehicle 304 will travel along the second altered route 312 to view a part of the obstructed region 302. According to another example, it is contemplated that a duration of time that the autonomous vehicle 100 has been stopped behind the car 300 can be utilized when selecting a route (e.g., a longer route may be selected for the second autonomous vehicle 304 if the autonomous vehicle 100 has been waiting a longer time behind the car 300).

Figure 4:
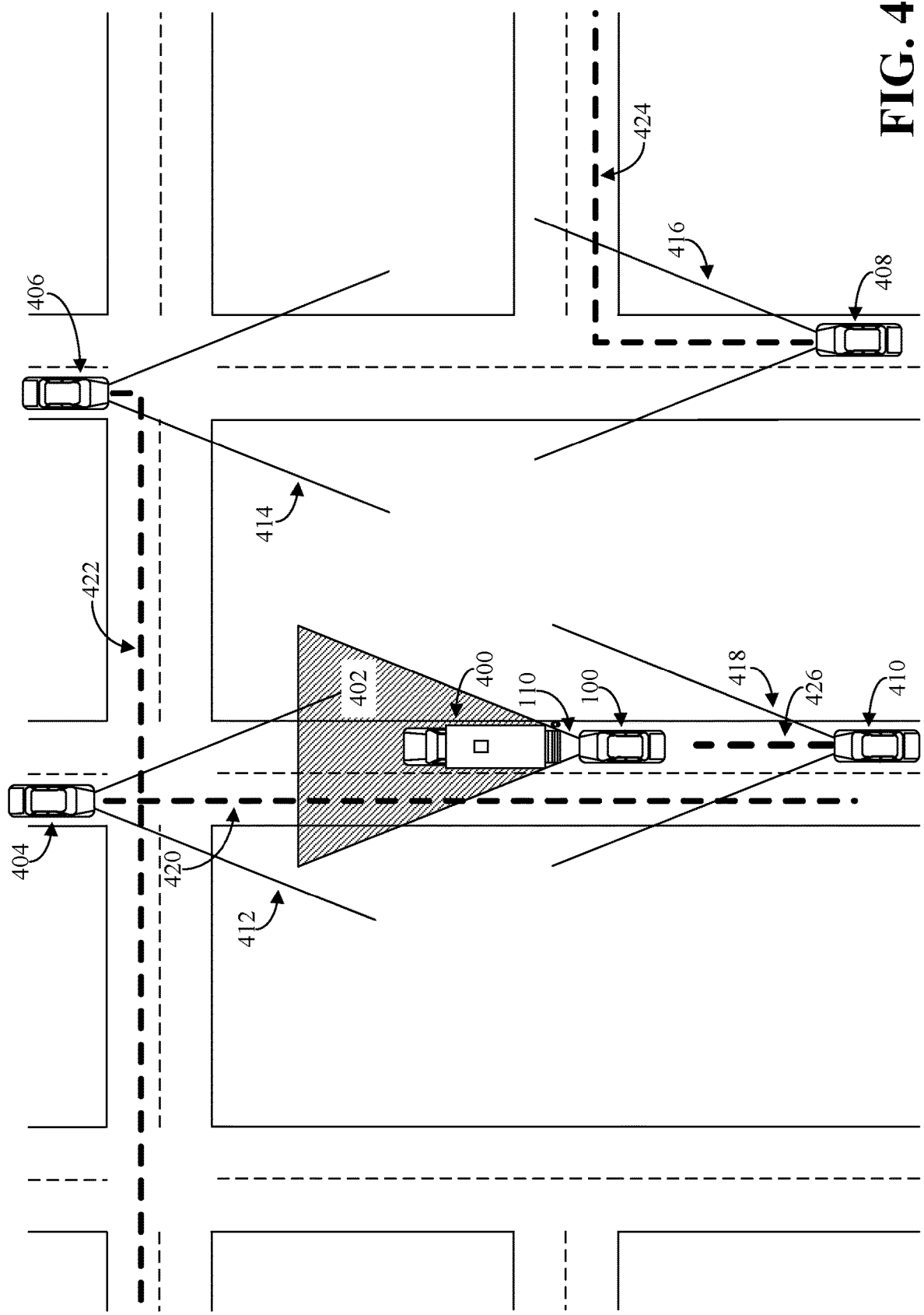
FIG. 4 illustrates another exemplary driving environment of an autonomous vehicle.

Turning now to FIG. 4, illustrated is an embodiment in which a fleet of autonomous vehicles are operating within the driving environment of the autonomous vehicle 100. In order to regulate how much bandwidth is to be allocated for transmitting data from and receiving data at the autonomous vehicle 100, only a select autonomous vehicle(s) from the fleet of autonomous vehicles will provide the fill data and/or receive the request for fill data. Any suitable criteria may be used for selecting which autonomous vehicle from the fleet of autonomous vehicles provides the fill data and/or receives the request for fill data. For example, the autonomous vehicle may be selected based on proximity to the autonomous vehicle 100. In another example, the autonomous vehicle may be selected based on the current route of the autonomous vehicle. In yet another example, the autonomous vehicle may be selected based on a direction at which the autonomous vehicle approaches the obstructing object.

In the illustrated embodiment, a fleet of autonomous vehicles, including a first autonomous vehicle 404, a second autonomous vehicle 406, a third autonomous vehicle 408, and a fourth autonomous vehicle 410 (collectively referred to as "autonomous vehicles 404-410"), are operating in a driving environment of the autonomous vehicle 100. Each of the autonomous vehicles 404-410 has a respective field of view 412-418 and each are traveling along a respective route 420-426.

The autonomous vehicle 100 has detected that an object (truck 400) has obscured a portion 402 of the field of view 110 of the autonomous vehicle 100. Responsive to detecting the obscured portion 402, the autonomous vehicle 100 transmits a request for one or more of autonomous vehicle(s) from the fleet of autonomous vehicles 404-410 to view the obscured portion 402.

The autonomous vehicle(s), if any, may be selected from the fleet of autonomous vehicles 404-410 via any suitable method. For instance, a process of elimination may be used to filter down the number of autonomous vehicles considered. For example, autonomous vehicles traveling along routes away from the obstructed region 402 may be eliminated from consideration. This is illustrated by the third autonomous vehicle 408 that is traveling along route 424 away from the obstructed region 402. In another example, autonomous vehicles traveling along a route in the same lane and direction as the autonomous vehicle 100 may be eliminated from consideration because the autonomous vehicles would not be able to "see" around the object (the truck 112). This is illustrated by the fourth autonomous vehicle 410 which is traveling along route 426 which is the same direction as the autonomous vehicle 100. In yet another example, where an autonomous vehicle(s) is currently traveling along a route that passes through the obstructed region 402, autonomous vehicles(s) that are currently traveling along a route that does not pass through the obstructed region 402 may be eliminated from consideration. Therefore, because the first autonomous vehicle 404 is already traveling along route 420 that passes through the obstructed region 402, the second autonomous vehicle 406 traveling along route 422 that doesn't pass through the obstructed region 402 may be eliminated from consideration. Accordingly, by process of elimination, the autonomous vehicle 100 need only receive fill data from the first autonomous vehicle 404.

In the preceding embodiments, a single autonomous vehicle was used to provide the fill data to the autonomous vehicle 100. However, it is contemplated that more than one autonomous vehicle can be used to provide the fill data. For instance, where the obscured portion includes intersecting roads, it may be desirable for autonomous vehicles to provide fill data from each of the intersecting roads.

Figure 5:
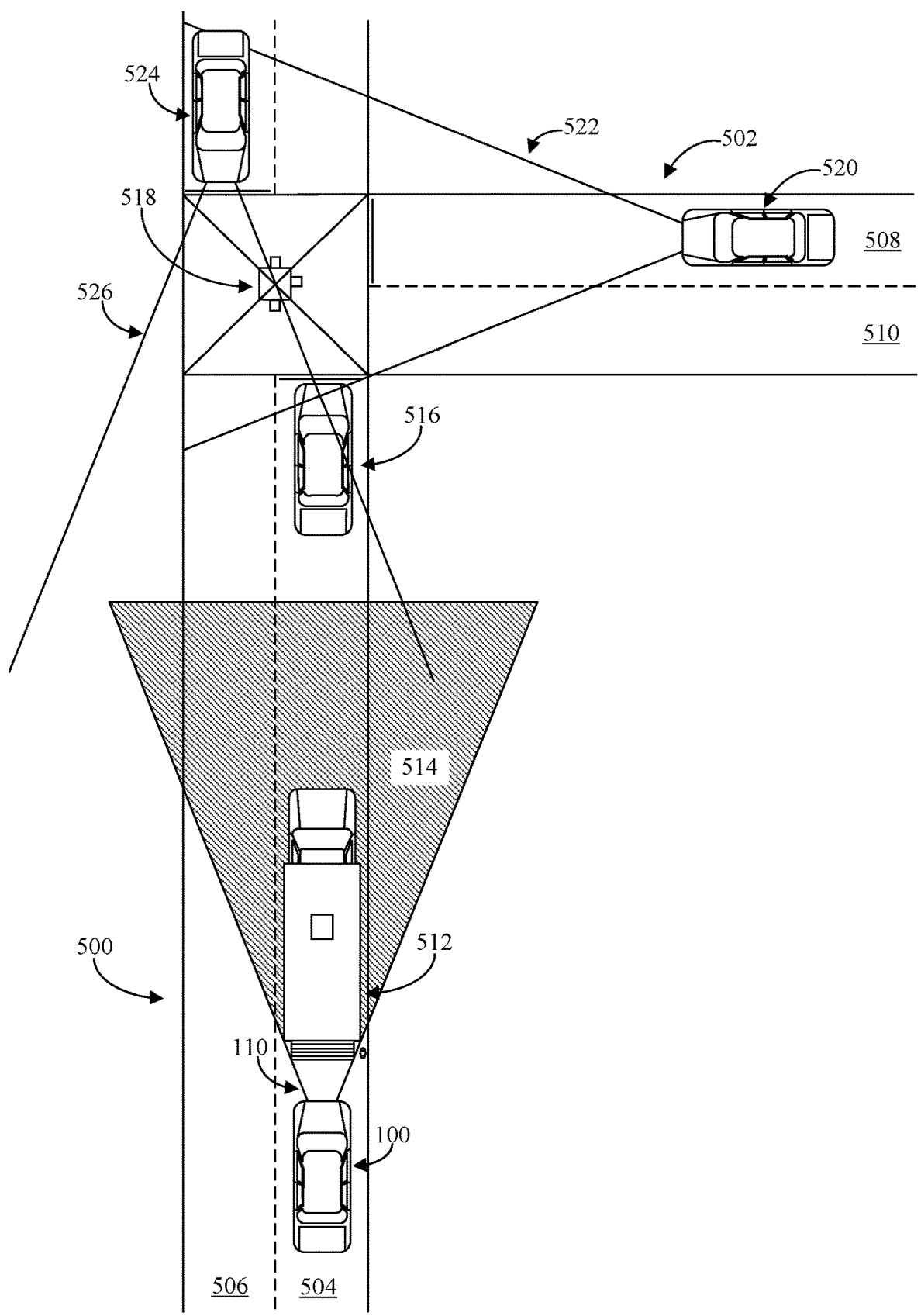
FIG. 5 illustrates a further exemplary driving environment of an autonomous vehicle.

Illustrated in FIG. 5 is a driving environment comprising a first roadway 500 that intersects with a second roadway 502. The first roadway 500 includes a first lane 504 (where the autonomous vehicle 100 is traveling in the first lane 504) and a second lane 506, where traffic flows in opposite directions in the first lane 504 and the second land 506. The second roadway 502 includes a first lane 508 and a second lane 510, where traffic flows in opposite directions in the first lane 508 and the second lane 510. The intersection of the first roadway 500 and the second roadway 502 further includes a traffic light 518 that may control the flow of traffic through the intersection.

As the autonomous vehicle 100 travels in the first lane 504, a truck 512 is stopped in the first lane 504 and the autonomous vehicle 100 traveling in the first lane 504 has come behind the stopped truck 512 in the first lane 504. As the autonomous vehicle 100 approaches the back of the truck 512, a portion of the field of view 110 of the sensor systems in the autonomous vehicle 100 is obstructed by the truck 512, the resulting obstructed region illustrated at 514. In the illustrated embodiment, the obstructed region 514 includes a portion of the second lane 506, a portion of the first lane 504 between a front of the truck 512 and the intersection, and the intersection itself. In order to navigate around the truck 512, the autonomous vehicle 100 determines that there are no objects in the portion of the second lane 506 in the obscured region 514 and that there is room to reenter the first lane 504 between the front of the truck 512 and the intersection.

To this end, the autonomous vehicle 100 may request a second autonomous vehicle view a portion of the obstructed region 514 and provide fill data to the autonomous vehicle 100. A second autonomous vehicle 524 currently on an opposing side of the intersection and travelling in the second lane 506 may view a part of the obstructed region 514 that is in the field of view 526 of the second autonomous vehicle 524. The second autonomous vehicle 524 may determine that currently there are no objects in the portion of the second lane 506 in the obstructed region 514 and/or that there is an object (car 516) in the portion of the first lane 504 between a front of the truck 512 and the intersection. The second autonomous vehicle 524 may further determine that there is room between the front of the truck 512 and the car 516 for the autonomous vehicle 100 to reenter the first lane 504 after traveling around the truck 512.

However, because of the presence of the intersection, between the second autonomous vehicle 524 and the portion of the second lane 506 the autonomous vehicle 100 would be traveling through to maneuver around the truck 512, the second autonomous vehicle 524 may not be able to determine that there would be no objects in the portion of the second lane 506 as the autonomous vehicle 100 travels in the second lane 506 around the truck 512. More particularly, an object may enter the second lane 506 from the second roadway 502 while the autonomous vehicle 100 is travelling in the second lane 506 around the truck 512. For instance, the second autonomous vehicle 524 may not be able to detect whether the second roadway 502 has a green light at the traffic light 518 permitting an object in the second roadway 502 to enter the second lane 506, while the autonomous vehicle 100 is travelling in the second lane 506 around the truck 512. Accordingly, a third autonomous vehicle 520 with a field of view 522 traveling in a first lane 508 of the second roadway 502 toward the intersection may present second fill data detecting whether the second roadway 502 has a green light at the traffic light 518 and/or whether the second roadway 502 includes any objects that can enter the second lane 506 of the first roadway 500 while the autonomous vehicle 100 is travelling in the second lane 506 around the truck 512.

The autonomous vehicle 100 can then receive this fill data from the second autonomous vehicle 524 and the third autonomous vehicle 520 and then use this fill data to fill in portions of the obstructed region 514.

Figure 6:
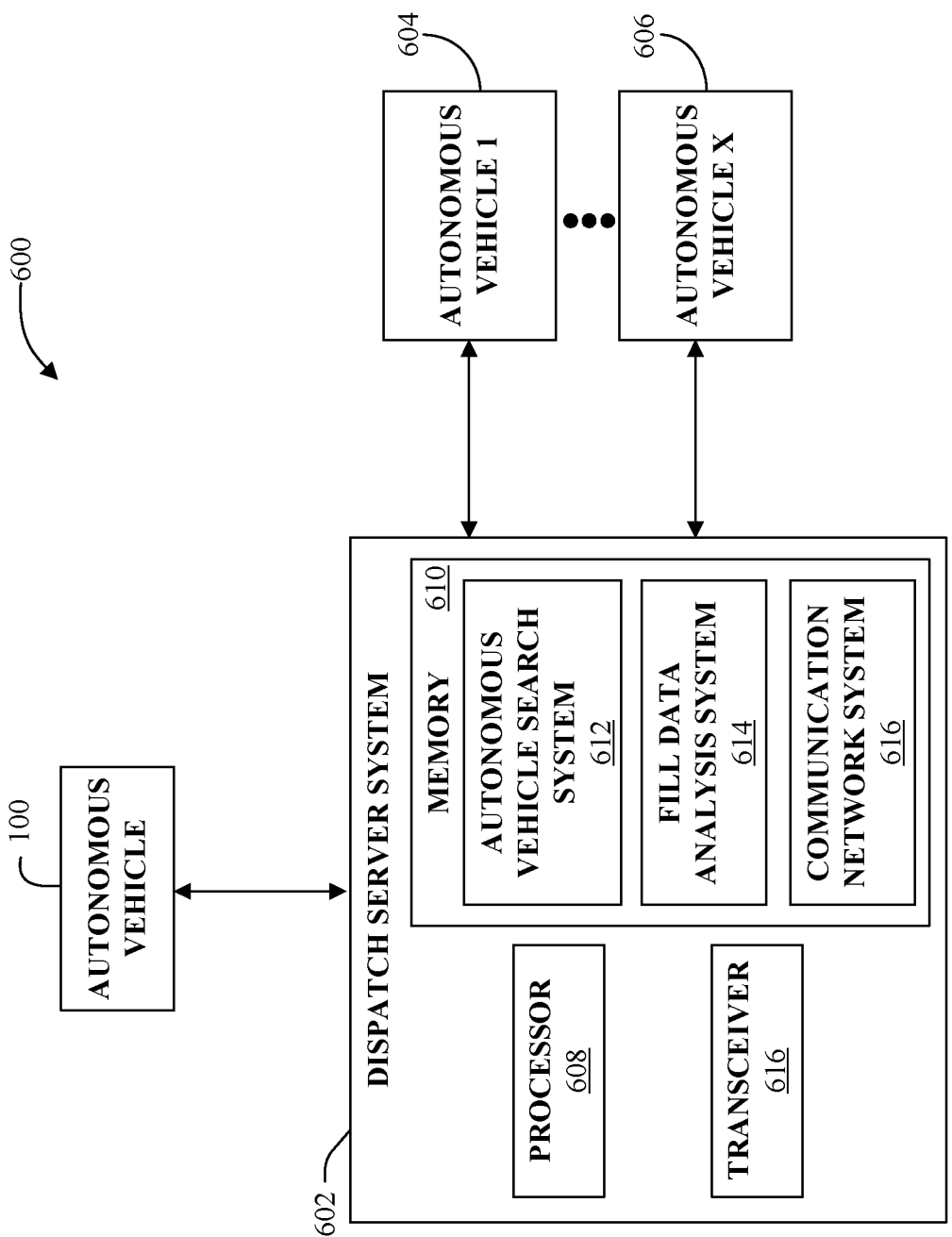
FIG. 6 illustrates an exemplary system configured to provide fill data to an autonomous vehicle from an autonomous vehicle fleet.

Turning now to FIG. 6, illustrated is a system 600 configured to provide an autonomous vehicle with fill data from one or more autonomous vehicle in an autonomous vehicle fleet. In one embodiment, illustrated in FIG. 6, the system 600 includes a computing system (e.g., dispatch server system 602) that is in communication with an autonomous vehicle (e.g., autonomous vehicle 100). In order to transmit data to the dispatch server system 602 and/or receive data from the dispatch server system 602, the autonomous vehicle 100 includes a transceiver (transceiver 124). The transceiver is configured to transmit data from the autonomous vehicle 100 and/or receive data at autonomous vehicle 100. Thus, the autonomous vehicle 100 can be in communication with the dispatch server system 602.

In the illustrated embodiment, the dispatch server system 602 is in communication with a plurality of other autonomous vehicles, namely, autonomous vehicle 1 604, ..., and autonomous vehicle X 606, where X can be substantially any integer greater than or equal to 2 (collectively referred to herein as autonomous vehicles 604-606). The autonomous vehicles 604-606 may be in the same fleet of autonomous vehicles and/or may be part of different fleets of autonomous vehicles. In another embodiment, the dispatch server system 602 can be in communication with a single autonomous vehicle (e.g., the autonomous vehicle 1 604).

In order to transmit data to the autonomous vehicle 100 and/or the autonomous vehicles 604-606 and/or receive data therefrom, the dispatch server system 602 may further include a transceiver 616. The transceiver 616 is configured to transmit data from the dispatch server system 602 and/or receive data at the dispatch server system 602. Thus, the dispatch server system 602 can be in communication with the autonomous vehicle 100 and/or the autonomous vehicles 604-606.

The dispatch server system 602 is configured to receive a request from the autonomous vehicle 100 for a second autonomous vehicle to view at least a part of the obscured portion of the field of view, as described above, and, in response to receiving the request, transmit a signal to one or more of the autonomous vehicles 604-606. The signal transmitted to the autonomous vehicle(s) can indicate a request for the autonomous vehicle(s) to view the obscured portion of the field of view of the autonomous vehicle 100 while the autonomous vehicle(s) travels along a route the autonomous vehicle is following in an environment.

In one embodiment, the dispatch server system 602 may transmit different signals based on the travel paths of the autonomous vehicles 604-606 in an environment. For instance, the dispatch server system 602 can transmit the signal when a route taken by one or more of the autonomous vehicles 604-606 passes within a threshold distance of the obscured portion. In another embodiment, the dispatch server system 602 may transmit the same signal to the autonomous vehicles 604-606, regardless of the travel path of the autonomous vehicles 604-606. In another embodiment, the dispatch server system 602 may be configured to establish a communication network between the autonomous vehicle 100 and one or more of the autonomous vehicles 604-606.

According to an example, the signal transmitted by the dispatch server system 602 can specify a route to be taken by a particular one of the autonomous vehicles 604-606. Pursuant to another example, the signal transmitted by the dispatch server system 602 can specify a location by which one or more of the autonomous vehicles 604-606 is to pass.

In order to achieve the actions described above, the dispatch server system 602 can include a processor 608 and memory 610 that includes computer-executable instructions that are executed by the processor 608. The memory 610 may include an autonomous vehicle search system 612, a fill data analysis system 614, and/or a communication network system 616.

The autonomous vehicle search system 612 is configured to transmit a signal to one or more of the autonomous vehicles 604-606. In one embodiment, the autonomous vehicle search system 612 may be configured to transmit a similar signal to one or more of the autonomous vehicles 604-606. In another embodiment, the autonomous vehicle search system 612 may be configured to transmit the signal based on a travel path of the autonomous vehicle. More specifically, the autonomous vehicle search system 612 may transmit the signal only when a travel path of the autonomous vehicle takes the autonomous vehicle within a threshold distance of the obscured portion. In another embodiment, the autonomous vehicle search system 612 may select which autonomous vehicle to transmit the signal too based on the process of elimination described above with respect to FIG. 4.

The fill data analysis system 614 is configured to receive fill data from one or more of the autonomous vehicles 604-606. In one embodiment, the fill data analysis system 614 may function similar to a conduit by receiving, via the transceiver 616, fill data from one or more of the autonomous vehicles 604-606 and transmitting fill data, via the transceiver 616, to the autonomous vehicle 100. In one example, the fill data analysis system 614 may transmit fill data to the autonomous vehicle 100 that is similar to the fill data received from one or more of the autonomous vehicles 604-606. In another example, the fill data analysis system 614 may modify or process fill data received from one or more of the autonomous vehicles 604-606 before transmitting fill data to the autonomous vehicle 100. Fill data transmitted to the autonomous vehicle 100 may be configured for use by the autonomous vehicle 100 to fill in a part of the obscured portion.

In another embodiment, the fill data analysis system 614 may receive data indicative of the obstructed portion of the field of view of the autonomous vehicle 100 and generate data of a modified field of view by filling in a part of the obstructed portion with fill data received from one or more of the autonomous vehicles 604-606. This data of the modified field of view may be transmitted to the autonomous vehicle 100 for use by the autonomous vehicle 100.

The communication network system 616 is configured to enable communication between the autonomous vehicle 100 and one or more of the autonomous vehicles 604-606. In another embodiment, the communication network system 616 establishes the peer-to-peer network connection between the autonomous vehicle 100 and the one or more autonomous vehicles 604-606. Any suitable method may be employed for establishing this peer-to-peer network connection.

Figure 7:
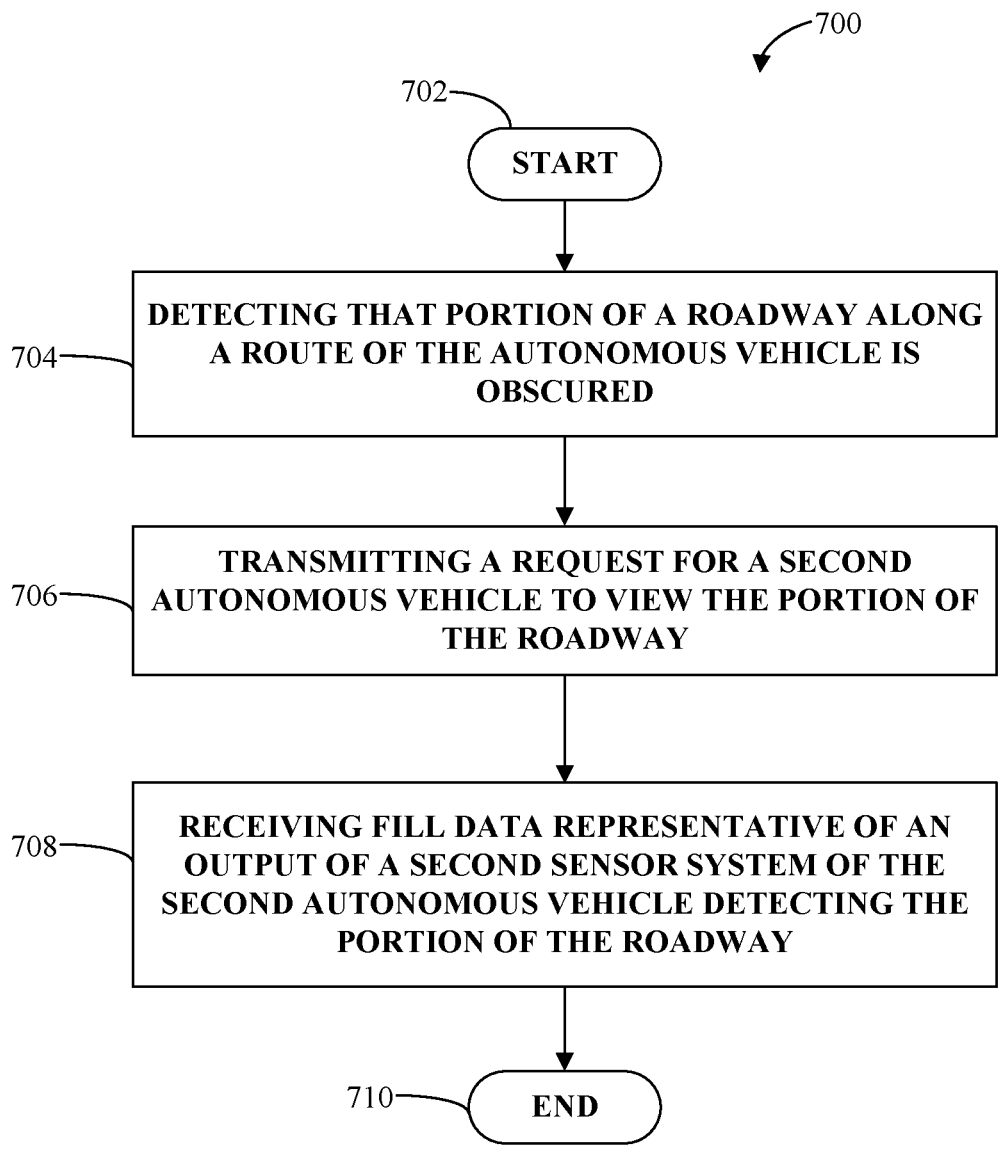
FIG. 7 is a flow diagram that illustrates an exemplary methodology executed by a computing system of an autonomous vehicle for requesting a second autonomous vehicle view a spatial region that is obstructed from the perspective of a sensor of the autonomous vehicle.

FIG. 7 illustrates an exemplary methodology 700 for sharing sensor data to assist in maneuvering an autonomous vehicle. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 7 an exemplary methodology 700 for sharing sensor data to assist in maneuvering an autonomous vehicle is illustrated. The methodology 700 begins at 702, and at 704, a computing system detects that a portion of a roadway along a route of the autonomous vehicle in a field of a view of a sensor system of the autonomous vehicle is obscured. At 606, responsive to detecting the portion of the roadway is obscured, the computing system can transmit a request for a second autonomous vehicle to view the portion of the roadway. A position of the second autonomous vehicle relative to the portion of the roadway is different from a position of the autonomous vehicle relative to the portion of the roadway when detecting the portion of the roadway is obscured. At 708, responsive to transmitting the request, the computing system can further receive fill data representative of an output of a second sensor system of the second autonomous vehicle detecting the portion of the roadway. The methodology 700 concludes at 710.

In an embodiment of the methodology 700, the step of transmitting the request comprises transmitting the request to a dispatch server system. The request may be configured to cause the dispatch server system to select the second autonomous vehicle from a fleet of autonomous vehicles. In one version of this embodiment, the second autonomous vehicle is selected based on a route of the second autonomous vehicle passing within a threshold distance from the portion of the roadway. In another version of this embodiment, responsive to detecting the portion of the roadway is obscured, transmitting direction data to the dispatch server system. The direction data is representative of a direction of travel of the autonomous vehicle relative to the portion of the roadway when detecting the portion of the roadway is obscured. The second autonomous vehicle may be selected based direction of travel of the second autonomous vehicle when viewing the portion of the roadway. The direction of travel of the second autonomous vehicle is different from the direction of travel of the autonomous vehicle.

In another embodiment of the methodology 700, the computing system can establish a peer-to-peer network connection between the autonomous vehicle and the second autonomous vehicle prior to receiving the fill data. The fill data can be received by the autonomous vehicle over the peer-to-peer network connection. In a further embodiment of the methodology 700, the computing system can be an intermediary between the autonomous vehicle and the second autonomous vehicle.

In a further embodiment of the methodology 700, responsive to detecting the portion of the roadway is obscured, a direction of travel of the autonomous vehicle relative to the portion of the roadway when detecting the portion of the roadway is obscured, a timestamp of when the obscured portion of the roadway was detected, and/or a route of the autonomous vehicle can be transmitted.

In yet another embodiment of the methodology 700, responsive to detecting the portion of the roadway is obscured, a determination can be made concerning whether an object is obscuring the portion of the roadway. Moreover, an object class of the object can be identified. Examples of object classes can include a vehicle, building, sign, or rubble; however, other object classes can additionally or alternatively be utilized. Further, data representative of the object class can be transmitted to a dispatch server system.

Figure 8:
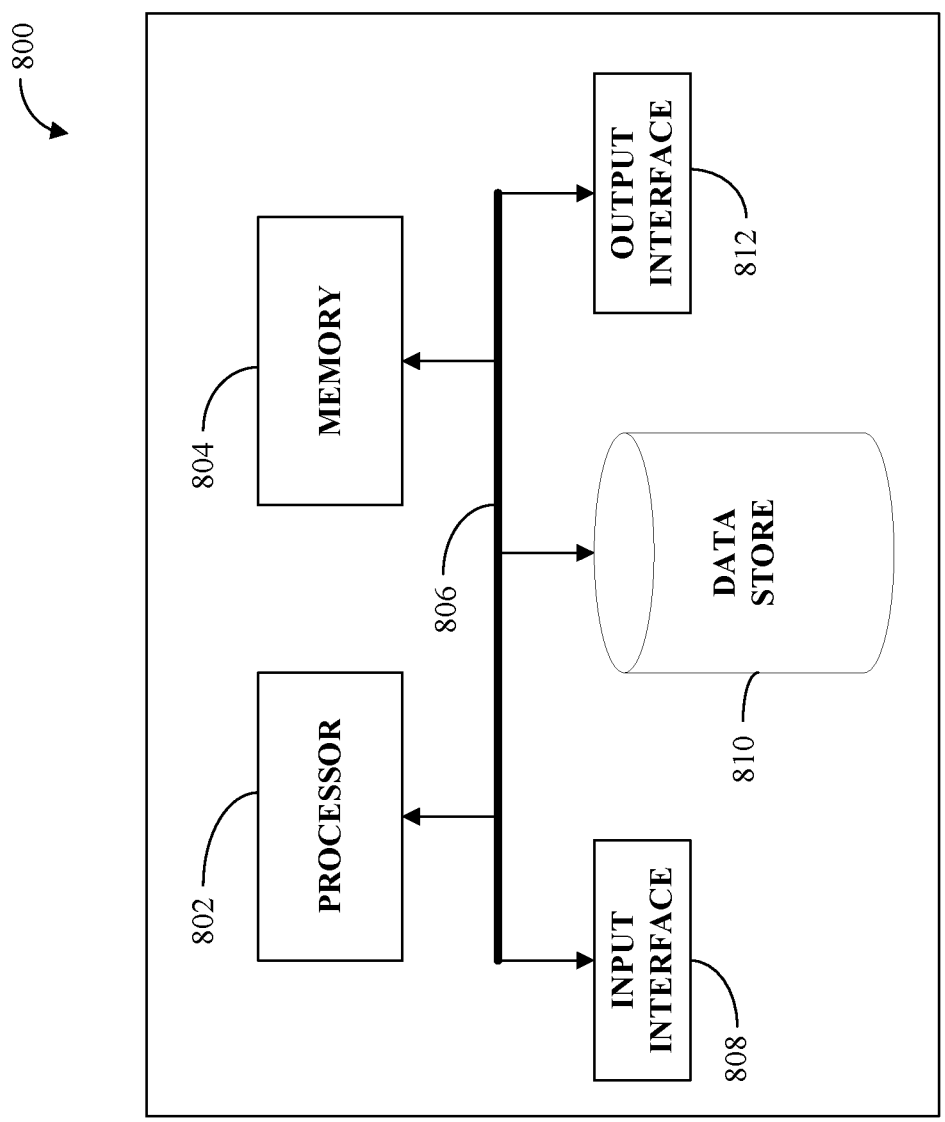
FIG. 8 illustrates an exemplary computing system.

Referring now to FIG. 8, a high-level illustration of an exemplary computing device that can be used in accordance with the systems and methodologies disclosed herein is illustrated. For instance, the computing device 800 may be or include the computing system 126. Pursuant to another example, the computing system 126 can include the computing device 800. According to another example, the computing device 800 may be or include the dispatch server system 602. In yet another example, the dispatch server system 602 can include the computing device 800. The computing device 800 includes at least one processor 802 that executes instructions that are stored in a memory 804. The instructions may be, for instance, instructions for implementing functionality described as being carried out by one or more components discussed above or instructions for implementing one or more methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store information pertaining to obscured regions, fill data from other autonomous vehicle(s), etc.

The computing device 800 additionally includes a data store 810 that is accessible by the processor 802 by way of the system bus 806. The data store 810 may include executable instructions, information pertaining to obscured regions, fill data from other autonomous vehicle(s), etc. The computing device 800 also includes an input interface 808 that allows external devices to communicate with the computing device 800. For instance, the input interface 808 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   a sensor system configured to detect an environment in a field of view of the autonomous vehicle, wherein the sensor system is further configured to output data of the detected environment;
   a computing system that is in communication with the sensor system, wherein the computing system comprises:
   a processor; and
   memory that stores computer-executable instructions that, when executed by the processor, cause the processor to perform acts comprising:
   detecting that a portion of a roadway along a route of the autonomous vehicle in the field of view of the autonomous vehicle is obscured;

responsive to detecting the portion of the roadway is obscured, transmitting a request for a second autonomous vehicle to view the portion of the roadway, wherein the request is transmitted to a dispatch server system, wherein the request is configured to cause the dispatch server system to select the second autonomous vehicle from a fleet of autonomous vehicles, wherein a position of the second autonomous vehicle relative to the portion of the roadway when viewing the portion of the roadway is different from a position of the autonomous vehicle relative to the portion of the roadway when detecting the portion of the roadway is obscured; and receiving fill data representative of an output of a second sensor system of the second autonomous vehicle detecting the portion of the roadway in a field of view of the second autonomous vehicle.

2. The autonomous vehicle of claim 1, wherein the second autonomous vehicle is selected based on a route of the second autonomous vehicle passing within a threshold distance from the portion of the roadway.

3. The autonomous vehicle of claim 1, the acts further comprising:

responsive to detecting the portion of the roadway is obscured, transmitting direction data to the dispatch server system, wherein the direction data is representative of a direction of travel of the autonomous vehicle relative to the portion of the roadway when detecting the portion of the roadway is obscured, wherein the second autonomous vehicle is selected based on a direction of travel of the second autonomous vehicle when viewing the portion of the roadway, wherein the direction of travel of the second autonomous vehicle is different from the direction of travel of the autonomous vehicle.

4. The autonomous vehicle of claim 1, the acts further comprising:

establishing a peer-to-peer network connection between the autonomous vehicle and the second autonomous vehicle prior to receiving the fill data, wherein the fill data is received over the peer-to-peer network connection.

5. The autonomous vehicle of claim 1, the acts further comprising:

responsive to detecting the portion of the roadway is obscured, transmitting at least one of data indicative of a direction of travel of the autonomous vehicle relative to the portion of the roadway when detecting the portion of the roadway is obscured, a timestamp identifying when the obscured portion of the roadway was detected, or a route of the autonomous vehicle.

6. The autonomous vehicle of claim 1, the acts further comprising:

responsive to detecting the portion of the roadway is obscured, determining that an object is obscuring the portion of the roadway;

identifying an object class of the object; and transmitting data representative of the object class to the dispatch server system.

7. The autonomous vehicle of claim 6, wherein the transmitted data includes at least one of velocity of the object, general dimensions of the object, or a timestamp of the detection.

8. The autonomous vehicle of claim 1, further comprising:

a vehicle propulsion system;

a braking system; and a steering system, the acts further comprising:

controlling at least one of the vehicle propulsion system, the braking system, or the steering system to maneuver the autonomous vehicle based on the fill data.

9. A method executed by a computing system of an autonomous vehicle, the method comprising:

detecting that a portion of a roadway along a route of the autonomous vehicle in a field of view of a sensor system of the autonomous vehicle is obscured;

responsive to detecting the portion of the roadway is obscured, transmitting a request for a second autonomous vehicle to view the portion of the roadway, wherein the request is transmitted to a dispatch server system, wherein the request is configured to cause the dispatch server system to select the second autonomous vehicle from a fleet of autonomous vehicles, wherein a position of the second autonomous vehicle relative to the portion of the roadway when viewing the portion of the roadway is different from a position of the autonomous vehicle relative to the portion of the roadway when detecting the portion of the roadway is obscured; and receiving fill data representative of an output of a second sensor system of the second autonomous vehicle detecting the portion of the roadway in a field of view of the second autonomous vehicle.

10. The method of claim 9, wherein the second autonomous vehicle is selected based on a route of the second autonomous vehicle passing within a threshold distance from the portion of the roadway.

11. The method of claim 9, further comprising:

responsive to detecting the portion of the roadway is obscured, transmitting direction data to the dispatch server system, wherein the direction data is representative of a direction of travel of the autonomous vehicle relative to the portion of the roadway when detecting the portion of the roadway is obscured, wherein the second autonomous vehicle is selected based on a direction of travel of the second autonomous vehicle when viewing the portion of the roadway, wherein the direction of travel of the second autonomous vehicle is different from the direction of travel of the autonomous vehicle.

12. The method of claim 9, further comprising:

establishing a peer-to-peer network connection between the autonomous vehicle and the second autonomous vehicle prior to receiving the fill data, wherein the fill data is received over the peer-to-peer network connection.

13. The method of claim 9, further comprising:

responsive to detecting the portion of the roadway is obscured, transmitting at least one of a direction of travel of the autonomous vehicle relative to the portion of the roadway when detecting the portion of the roadway is obscured, a timestamp of when the obscured portion of the roadway was detected, or a route of the autonomous vehicle.

14. The method of claim 9, further comprising:

responsive to detecting the portion of the roadway is obscured, determining that an object is obscuring the portion of the roadway;

identifying an object class of the object; and transmitting data representative of the object class to the dispatch server system.

15. An autonomous vehicle comprising:

a computer-readable storage medium that comprises instructions that, when executed by one or more processors, cause the one or more processors to perform acts comprising:

detecting that a portion of a roadway along a route of the autonomous vehicle in a field of view of a sensor system of the autonomous vehicle is obscured;

responsive to detecting the portion of the roadway is obscured, transmitting a request for a second autonomous vehicle to view the portion of the roadway to a dispatch server system, wherein the request is configured to cause the dispatch server system to select the second autonomous vehicle from a fleet of autonomous vehicles, wherein a position of the second autonomous vehicle relative to the portion of the roadway when viewing the portion of the roadway is different from a position of the autonomous vehicle relative to the portion of the roadway when detecting the portion of the roadway is obscured; and receiving fill data representative of an output of a second sensor system of the second autonomous vehicle detecting the portion of the roadway in a field of view of the second autonomous vehicle.

16. The autonomous vehicle of claim 15, the acts further comprising:

responsive to detecting the portion of the roadway is obscured, transmitting direction data to the dispatch server system, wherein the direction data is representative of a direction of travel of the autonomous vehicle relative to the portion of the roadway when detecting the portion of the roadway is obscured, wherein the second autonomous vehicle is selected based direction of travel of the second autonomous vehicle when viewing the portion of the roadway, wherein the direction of travel of the second autonomous vehicle is different from the direction of travel of the autonomous vehicle.

17. The autonomous vehicle of claim 15, the acts further comprising:

establishing a peer-to-peer network connection between the autonomous vehicle and the second autonomous vehicle prior to receiving the fill data, wherein the fill data is received over the peer-to-peer network connection.

18. The autonomous vehicle of claim 15, the acts further comprising:

responsive to detecting the portion of the roadway is obscured, determining that an object is obscuring the portion of the roadway;

identifying an object class of the object; and transmitting data representative of the object class to the dispatch server system.

19. The autonomous vehicle of claim 1, wherein a route of the second autonomous vehicle is selected based on the request.

20. The method of claim 9, wherein a route of the second autonomous vehicle is altered based on the request.

* * * * *